US010200312B1

(12) United States Patent
Singh et al.

(10) Patent No.: US 10,200,312 B1
(45) Date of Patent: *Feb. 5, 2019

(54) POWER MANAGEMENT OF ROUTING TABLES USING HORIZONTAL SCALING

(71) Applicant: Amazon Technologies, Inc., Seattle, WA (US)

(72) Inventors: Bijendra Singh, Cedar Park, TX (US); Kari Ann O'Brien, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

This patent is subject to a terminal disclaimer.

(21) Appl. No.: 15/148,947

(22) Filed: May 6, 2016

(51) Int. Cl.
| | |
|---|---|
| *H04L 12/931* | (2013.01) |
| *H04L 12/947* | (2013.01) |
| *H04L 12/751* | (2013.01) |
| *H04L 12/743* | (2013.01) |
| *H04L 12/24* | (2006.01) |

(52) U.S. Cl.
CPC .............. *H04L 49/40* (2013.01); *H04L 41/08* (2013.01); *H04L 45/02* (2013.01); *H04L 45/7453* (2013.01); *H04L 49/25* (2013.01)

(58) Field of Classification Search
CPC ..... H04L 49/40; H04L 41/08; H04L 45/7453; H04L 49/25; H04L 45/02
See application file for complete search history.

(56) References Cited

U.S. PATENT DOCUMENTS

| 8,938,469 B1* | 1/2015 | Keen ................... H04L 45/7453 707/747 |
| 9,898,069 B1* | 2/2018 | O'Brien ............... G06F 1/3275 |
| 2003/0026259 A1 | 2/2003 | Brown |
| 2004/0100950 A1* | 5/2004 | Basu ....................... H04L 45/00 370/389 |
| 2012/0307640 A1* | 12/2012 | Wackerly ............... H04L 45/54 370/241 |

OTHER PUBLICATIONS

U.S. Appl. No. 15/087,291, filed Mar. 31, 2016, Titled: Power Reduction Methods for Variable Sized Tables.
U.S. Appl. No. 15/148,965, filed May 6, 2016, Titled: Power Management of Routing Tables Using Vertical Scaling.
U.S. Appl. No. 14/981,664, filed Dec. 28, 2015, Titled: Pipelined Evaluations for Algorithmic Forwarding Route Lookup.

* cited by examiner

*Primary Examiner* — Christine Ng
(74) *Attorney, Agent, or Firm* — Kilpatrick Townsend & Stockton LLP

(57) ABSTRACT

Power management of a routing table is provided by supporting various power domain configurations. Each power domain configuration can be associated with a different number of power domains than other power domain configurations. Efficient power management can be achieved by switching between a lower power domain configuration and a higher power domain configuration during run-time based on the dynamic load conditions.

24 Claims, 12 Drawing Sheets

POWER MANAGEMENT OF ROUTING TABLES USING HORIZONTAL SCALING

BACKGROUND

Data tables can be used in various electronic and computer devices to store data in an organized manner so that specific data elements can later be retrieved. For example, network switches can contain large data tables that can include routing tables that can store and/or update the identifiers associated with forwarding of network data to other interconnected network devices. These identifiers can indicate network routes (or the next stop along such a route) to the other network devices. The size of these routing tables can become increasingly large when associated with large numbers of network devices.

Routing tables are traditionally implemented using Ternary Content-Addressable Memories (TCAMs) for faster route lookup time. However, TCAMs consume more power as compared to static random access memories (SRAMs). In some instances, blocks of TCAMs can be switched on or off at power-up of a network device to save power based on a deployment configuration. However, once the network device is deployed in the field, power configuration of the network device cannot be changed based on changing load conditions. In most instances, changing the power configuration may require rebooting of the network device. This can result in loss of packets or re-routing of the packets causing huge overhead at the system level.

BRIEF DESCRIPTION OF THE DRAWINGS

Various embodiments in accordance with the present disclosure will be described with reference to the drawings, in which.

DETAILED DESCRIPTION

Figure 1:
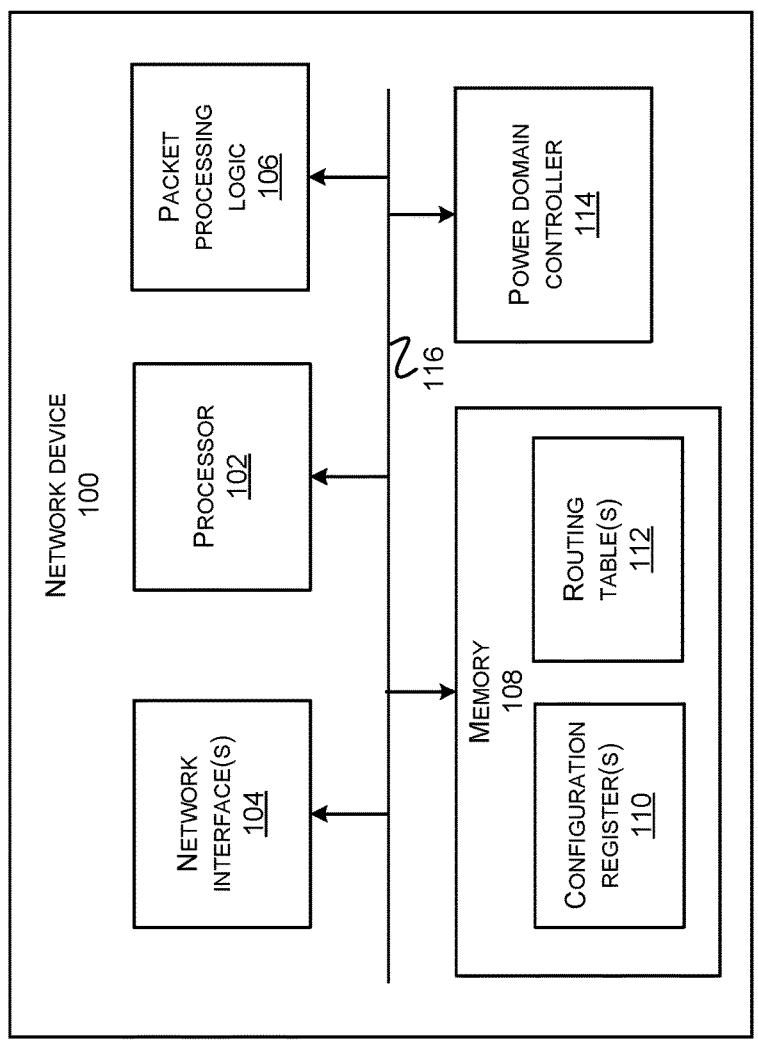
FIG. 1 illustrates a network device according to an embodiment of the disclosed technologies.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Data tables are structures that can be used in many different computer devices for various purposes. Data tables can comprise many different elements and can be used to locate a specific element of the data table. Various algorithms, such as hash or key generation algorithms can be used to store and/or retrieve data associated with specific elements of a data table according to a specific input data set. As one example, a routing table for a network device can comprise a type of data table. The routing table may also be called a forwarding table. The network device can be a switch, a router, a hub, a node or any suitable network capable device. The network device can receive network packets and route them to appropriate external network devices on a network. One method for determining the next destination for such a transfer is through the use of a routing table. A routing table can comprise indicators of multiple network addresses, each corresponding to an external network device. A network device can receive a network packet as an input data set which can be parsed and associated with an element of a routing table. By locating the associated entry, the network device can obtain a routing indicator and then forward the network packet to the appropriate external networking device. For example, a final destination address can be parsed from the network packet. A routing table can be used to retrieve a destination of an external network device that the network packet can be transferred to intermediately on route to the final destination.

In most instances, a routing table for a network device is implemented using ternary content-addressable memories (TCAMs). A TCAM is a specialized type of high-speed memory that can search its entire contents in, for example, a single clock cycle by performing parallel searches. Generally, an ingress packet includes a network address, which can vary in size depending on a subnet configuration, and a host address, which can occupy the remaining bits. Each subnet has a network mask that specifies which bits of the address include the network address and which bits include the host address. Routing can be done by consulting the routing table which contains each known destination network address, the associated network mask, and the information needed to route packets to that destination. In a TCAM, the addresses can be stored using "don't care" for the host part of the address, so looking up the destination address in the TCAM can immediately retrieve the correct routing entry. This can only work if the entries are stored in order of decreasing network mask length. The hardware returns only the first matching entry; thus, the match with the longest network mask (longest prefix match) can be used. Thus, due to the ordering dependency in TCAMs, entries that appear in a lower index have a higher probability of a match than the entries that appear in a higher index.

It should be understood that depending upon the complexity and size of a network infrastructure, the size and complexity of a routing table for a network device of the network infrastructure can become large and unwieldy. Additionally, the network device is generally designed to operate in relatively large and relatively small network infrastructures. Consequently, the amount of memory can be selected to accommodate routing table(s) large enough to accommodate relatively large network infrastructures having many different networking devices. When such a network device is utilized in a relatively small network infrastructure, the entire memory space allocated for routing table(s) may not be fully utilized because the current routing table may be relatively small. The unused portions of memory dedicated to the routing table entries that are not used may still consume electrical power for maintenance or other operations. For these smaller network infrastructure implementations, this additional electrical power draw can result in excessive operating expenses to provide power for the unused memory, generate excessive heat for the device and the power providing circuitry, and lead to reduced maintenance schedules for the network device and supporting infrastructure to accommodate the additional power and heat.

In some instances, blocks of TCAMs can be turned on or off at reset or power-up to save power for certain deployment configurations, e.g., for relatively small network infrastructures which do not require large routing tables. However, once the network device is deployed in the field, power configuration cannot be changed dynamically to adjust power requirements due to change in load conditions. In most instances, the network device may need to be rebooted to configure it for a different power setting. This can result in a drop in packets or re-route of the packets passing through the network device at reboot. Hence, use of TCAMs in the routing table may result in system overhead and may not provide a flexible solution for power management in network devices.

Various embodiments of the disclosed technologies can utilize Static Random Access Memories (SRAMs) to implement routing tables using algorithmic TCAM techniques to provide a flexible solution for power reduction in network devices. A power management algorithm, in accordance with various embodiments, can continuously evaluate current load conditions in a network device in terms of a number of total network routes currently programmed and can dynamically re-distribute them to achieve minimum power consumption configuration and enable (e.g., turn-on) or disable (e.g., turn-off) parts of the routing tables to save power. In some embodiments, a routing table may include a plurality of buckets and each bucket may include multiple entries to store routing data. For example, in one implementation, a routing table may include 8K buckets (i.e., 8×1024 buckets), and each bucket may include 14 entries. In some embodiments, a routing table may be implemented using a hash table. Hash, being random in nature, can allow insertion of a route entry anywhere in the SRAMs used for implementing the routing table, in contrast to TCAMs which can be restricted to ordering dependency.

In some embodiments, a routing table can support a plurality of power domain configurations to implement power domain scaling. For example, each power domain configuration may include one or more power domains. The number of power domains for each power domain configuration may be different from other power domain configurations. Each successive power domain configuration from the plurality of successive power domain configurations can include one or more additional power domains than a prior power domain configuration. For example, a first power domain configuration may include one power domain, a second power domain configuration may include two power domains, a third power domain configuration may include four power domains, and so on. According to some embodiments, each power domain configuration can support a certain route capacity. For example, the route capacity may indicate a total number of routes that can be supported by a power domain configuration. Each successive power domain configuration can support a certain number of network routes which can be greater than the prior power domain configuration. The number of network routes supported by each power domain configuration can be predetermined or dynamically computed.

A power domain may include areas in a circuit that can generally be grouped by common power environments and power strategy, e.g., for power on and off conditions, operating voltage, power supply nets, etc. In some embodiments, a power domain may be associated with a set of entries. For example, a first set of entries from all the buckets may be associated with a first power domain, a second set of entries from all the buckets may be associated with a second power domain and a third set of entries from all the buckets may be associated with a third power domain, and so on. The first power domain, second power domain, and the third power domain may be enabled or disabled independently and without affecting other power domains. An enabled power domain may indicate that the power domain is turned-on (e.g., power is supplied to the circuit associated with the power domain) and a disabled power domain may indicate that the power domain is turned-off (e.g., no power is supplied to the circuit associated with the power domain).

According to some embodiments, each power domain may add horizontal capacity to the entire routing table by adding a fixed number of entries to each bucket. For example, the first power domain may add four entries to each bucket, the second power domain may add five entries to each bucket and the third power domain may add two entries to each bucket. Embodiments of the disclosed technologies can allow enabling or disabling of a power domain during run-time based on the route capacity of a current power domain configuration and a total number of routes at that point in time. For example, a current power domain configuration can be switched to a next higher or a next lower power domain configuration accordingly. A next higher power domain configuration may include a power domain configuration which has more power domains, and hence more route capacity than the current power domain configuration. A next lower power domain configuration may include a power domain configuration which has fewer power domains, and hence lower route capacity than the current power domain configuration. Thus, according to the embodiments, horizontal scaling can allow addition or removal of a fixed number of entries to each bucket across the routing table. Some embodiments of the technology can allow migration of entries from a domain associated with the higher power domain configuration to the domain(s) associated with the lower power domain configuration before disabling the said power domain associated with the higher power domain configuration. In some embodiments, a bucket can be compacted by migrating the entries of the bucket from locations associated with a higher power domain to unoccupied locations associated with a lower power domain within the same bucket. Therefore, embodiments of the disclosed technology can allow dynamic scaling of the power domains based on the real-time load conditions without rebooting the network device, thus minimizing system overhead for power management of the routing tables.

FIG. 1 illustrates a network device 100 according to an embodiment of the disclosed technologies. In some implementations, the network device 100 may be the recipient and/or generator of packets. The network device 100 may be configured to interface with a plurality of different networking devices (not shown). For example, the network device 100 can interface with personal computers, network switches, network hubs, mobile devices, or other networking devices. The network device 100 may be implemented as an application specific integrated circuit (ASIC), a field programmable gate array (FPGA), a system-on-chip (SoC), a system-in-package (SiP) or as any suitable circuit.

The network device 100 may include a processor 102, network interface(s) 104, a packet processing logic 106, a memory 108 and a power domain controller 114. Note that the network device 100 may include more or fewer components than illustrated in FIG. 1. An interconnect 116 can be used to pass information between the various components of the network device 100. For example, the interconnect 116 can include point-to-point interconnect(s), common bus(es), interconnect fabric, or a combination thereof.

The processor 102 may include one or more processing cores, e.g., an x86 or ARM® compatible processor cores. The processor 102 may be configured to execute instructions stored in a computer-readable medium. For example, the instructions may include instructions to implement some of the functionality associated with the power domain controller 114 or the routing tables 112. In some embodiments, the computer-readable medium may be part of the memory 108.

The network interface(s) 104 may include one or more interfaces to communicate with other devices on a network. In one implementation, the network interface(s) 104 may include one or more network ports (e.g., Ethernet ports) to communicate with other networking devices (not shown) on the network using a network protocol, e.g., Transmission Control Protocol/Internet Protocol (TCP/IP), Domain Name System (DNS), Hypertext Transfer Protocol (HTTP), Dynamic Host Configuration Protocol (DHCP), etc. The network interface(s) 104 can also implement various speeds and methods of transmission such as 100 Gigabit (G), 10G, 1G, wired or wireless transmissions. The network device 100 may receive or transmit a packet via the network interface 104. The packet may be a network packet, e.g., a Layer 3 (L3) packet, a label switching (LS) packet, a Layer 2 (L2) packet, etc. For example, the packet may be an Internet Protocol (IP) packet comprising an IP header and a payload.

The packet processing logic 106 may include logic to process the packets received via the network interface 104. For example, the packet processing logic 106 may include logic to parse the packet to extract a packet header and a payload. The packet header may include a source address, a destination address, a version number, a packet length, a time-to-live, and any other relevant information. In some implementations, the packet header may include information for forwarding the packet to the next destination on the network. For example, information from the packet header may be used to lookup an entry in the routing tables 112 to make forwarding decisions.

The memory 108 may include configuration register(s) 110 and routing table(s) 112. The memory 108 can be implemented using a static Random Access Memory (RAM), dynamic RAM, double date rate (DDR) RAM, flip-flops, or other types of memory suitable for storing data. The memory 108 can include memory partitioned or otherwise selected for use by the routing table(s) 112.

The configuration registers 110 may include one or more registers that may be used to store various configuration identifiers for various power domain configurations, route capacity (Rc) supported by various power domain configurations, and any other information. For example, the configuration identifiers may be used to identify different power domain configurations, e.g., a first power domain configuration, a second power domain configuration, a third power domain configuration, etc., that can be supported by the network device 100. In some embodiments, configuration registers 110 may be configured to store a plurality of successive power domain configurations. Each successive power domain configuration from the plurality of successive power domain configurations can include an additional power domain than a prior power domain configuration. For example, the first power domain configuration can include one power domain, the second power domain configuration can include two power domains, and the third power domain configuration can include three power domains, etc. In addition, each successive power domain configuration can support a higher number of network routes (e.g., route capacity) than the prior power domain configuration. As an example, the first power domain configuration can support 2K routes, the second power configuration can support 4K routes and the third power configuration can support 8K routes. The number of network routes supported by each power domain configuration can be predetermined or can be computed dynamically. For example, in one embodiment, the number of network routes supported by different power domain configurations can be predetermined based on simulation results or from field data and can be programmed at the power up time. In another embodiment, the number of network routes supported by different power domain configurations can be dynamically computed, e.g., based on types of current network routes, requests for insertion of new network routes in the routing tables, migration algorithms, etc. In some implementations, the number of network routes computed dynamically for different power domain configurations can be stored in the memory 108 that can be accessed by the power domain controller 114 to perform horizontal scaling of the power domains.

The routing table(s) 112 may be used to store data associated with routing of the network packets, e.g., network device addresses, distances between network device 100 and particular network destinations, or any other information used in forwarding or routing of the network packets. The routing tables 112 may include one or more routing tables as discussed with reference to FIG. 2.

Figure 2:
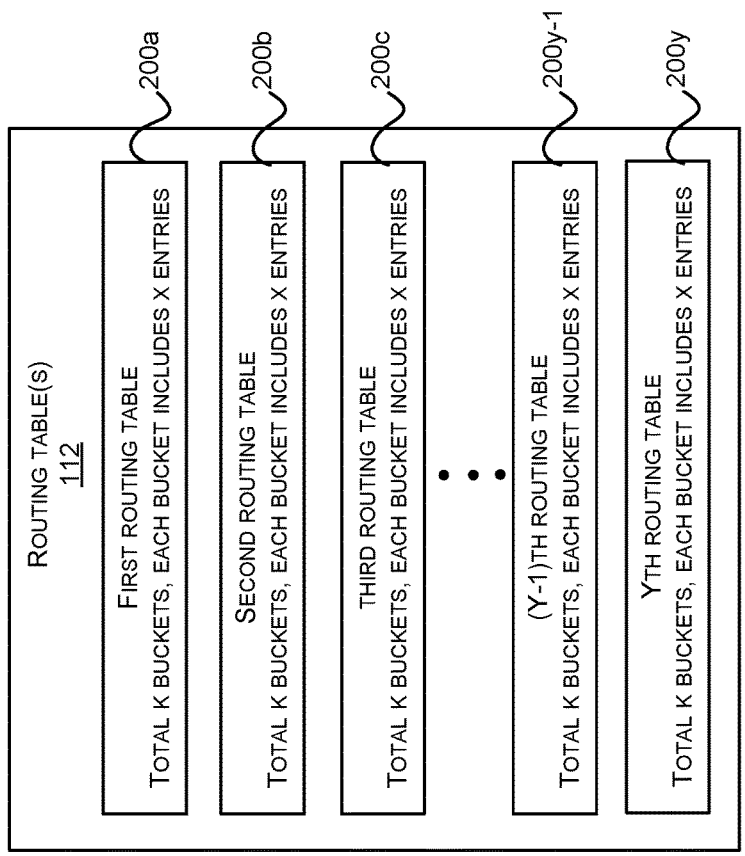
FIG. 2 illustrates a logical view of the routing tables, according to one embodiment of the disclosed technologies.

FIG. 2 illustrates a logical view of the routing tables 112, according to one embodiment of the disclosed technologies.

In one embodiment, the routing tables 112 may include a plurality of routing tables, e.g., a first routing table 200a, a second routing table 200b, a third routing table 200c, a $(Y-1)^{th}$ routing table 200y-1 and a $Y^{th}$ routing table 200y. Each of the routing tables 200a-200y may include K number of buckets. For example, each of the routing tables 200a-200y can be implemented using a data structure, e.g., an array of elements, and each bucket can be an element in the array of elements. Each of the K buckets may include X number of entries. For example, each entry can be used to store data associated with a network route. Thus, each routing table may include (K×X) number of entries, and the routing table 112 may include (Y×K×X) number of entries, where "×" is a multiplication factor. Each of the K, X and Y may include positive integers. For example, in one implementation, K can be 1024, X can be 14 and Y can be 8. According to some embodiments, each of the routing tables 200a-200y may be implemented using a hash table. A hash table is a data structure that implements an associative array which can map keys to values. For example, the hash table can be an array of elements, and each element can be called a bucket. A hash table uses a hash function to compute an index into an array of buckets or slots, from which the desired value can be found. A hash function that provides a uniform distribution of hash values can minimize hash collisions. Hashing allows distribution of the entries (key/value pairs) across an array of buckets. Given a key, the entry can be found using the index. The hash table implementation can allow insertion of a route entry in any of the hash tables without any ordering dependency as encountered by the TCAM implementation. In one implementation, each of the routing tables 200a-200y can be searched in parallel which can result in Y number of matches with equal priority. In some embodiments, each of the routing tables 200a-200y may be implemented using SRAMs. For example, the X number of entries may be implemented using multiple sets of SRAMs. Each set of SRAMs can be on an independent power domain which can be enabled or disabled for different power domain configurations. Routing tables 112 will be further explained with reference to FIG. 5.

Referring back to FIG. 1, the routing table(s) 112 may be used by the network device 100 to optimize prioritization of the transfer of network packets along with, for example, Quality of Service (QOS) or other optimizations. Although the routing table(s) 112 are used here as an example, it should be understood that various other functions (even outside of a network device) can be associated with and/or use the functionality of a data table or similar memory construct. As one such example, a device cache can use a data table to increment cache hits and/or misses. As such, this disclosure is not limited to a data table for use with only a network device such as the network device 100, but can be used in a wide variety of devices for a wide variety of purposes. Many data tables and other memory constructs can benefit from the disclosure herein. Depending upon the number of network devices within a particular implementation of a network device within a network infrastructure, the number of entries of the routing table(s) 112 can vary. If all of the entries of the routing table(s) 112 are not utilized, then all of the memory allocated for the routing table(s) 112 may not be used, but may still be powered. Generally, memory that is not utilized may consume power and may needlessly lead to increased power draw by a network device. Various embodiments of the disclosed technologies can continuously evaluate the current load conditions in the network device 100 in terms of the number of total routes currently programmed and dynamically re-distribute them to achieve minimum power consumption configuration and enable or disable parts of the routing tables 112 to save power using the power domain controller 114.

The power domain controller 114 may be configured to provide power management of the routing tables 112. In some embodiments, the power domain controller 114 may be configured to continuously evaluate the current load conditions in the network device 100 in terms of the total number of routes currently processed by the network device 100 and may dynamically re-distribute the entries among the power domains to achieve minimum power consumption configuration and disable and enable parts of the routing tables 112 to save power. In some implementations, the network device may start with a current power domain configuration at power-up. For example, the current power domain configuration may be determined by identifying a power domain configuration from a plurality of power domain configurations that can support a route capacity greater than a total number of network routes. For example, in some implementations, the total number of network routes may have been predetermined at the start-up time based on simulation results. In some implementations, the power domain controller 114 may determine the total number of network routes by accessing the configuration registers 110.

The power domain controller 114 may be configured to determine if the route capacity of the next lower power domain configuration is more or less than the total number of routes for the current power domain configuration. For example, in some instances, the current power domain configuration may include at least one more power domain than the next lower power domain configuration. If the route capacity of the next lower power domain configuration is more than the total number of current routes, the current power domain configuration can be switched to the next lower power domain configuration. For example, in some embodiments, the entries which extend into the power domain associated with the current power domain configuration, which is not part of the next lower power domain configuration, can be identified and migrated to the power domain(s) associated with the next lower power domain configuration. For example, migration can include moving data stored in the identified entries from a first location to a second location. The first and the second locations can be in the same bucket (e.g., compaction of buckets) or different buckets. Migration can be used to balance the usage of buckets or entries so that elements are evenly populated across associated buckets and/or entries. Thus, after the entries are migrated from the given power domain and all the buckets in the given power domain are empty, the power domain controller 114 can disable the given power domain from the current power domain configuration to save power. In some instances, the power domain controller 114 can enable a power domain when a request to insert a new route in the routing tables 112 is received. For example, if the total number of current routes is more than the route capacity of the current power domain configuration, the current power domain configuration may be switched to the next higher power domain configuration, which includes additional power domain(s), to add more capacity to the routing tables 112. The next higher domain configuration may include an addition of a fixed number of entries to the routing tables 112. The new route can be inserted into any of the entries from the power domains associated with the next higher power domain configuration. For example, the power domains associated with the next higher power domain configuration may include already enabled power domains and the additional power domain(s).

Figure 3:
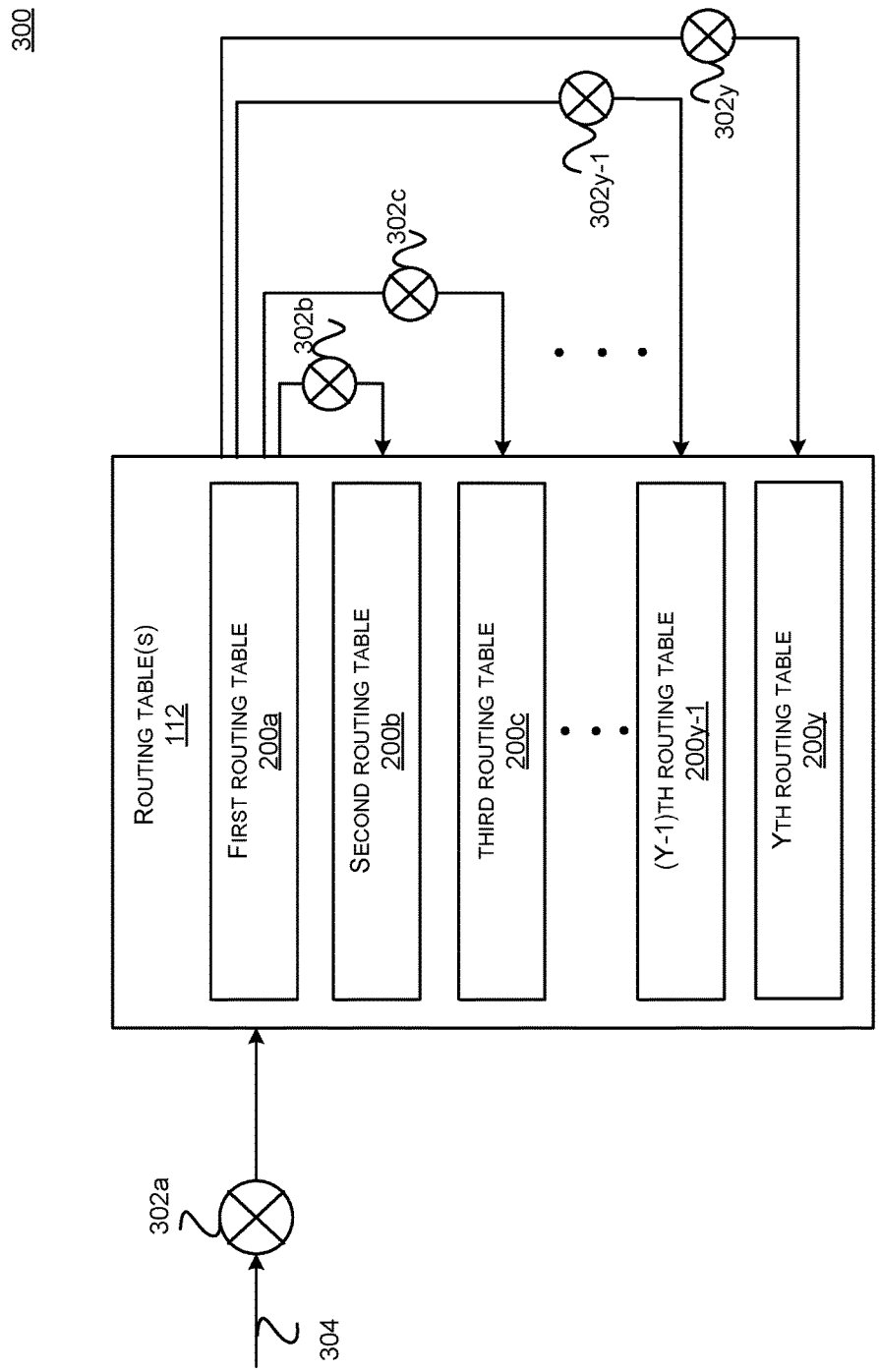
FIG. 3 illustrates a method to insert a route in the routing table.

FIG. 3 illustrates a method 300 to insert a route in the routing table. Embodiments of the disclosed technologies have been discussed using the method 300 for route insertion; however, it will be understood that any suitable route insertion method can be used.

In accordance with one embodiment, a hash function 302a may be used to insert a network route of a packet in the routing table 112. For example, the hash function 302a can be used to hash certain fields of a packet 304 to generate an index and a key to insert the network route in any of the buckets from any of the routing tables 200a-200y. In some embodiments, the hash function 302a may use a virtual routing and forwarding identifier (VRF-ID), and a prefix for a route from the packet 304. For example, in a given route "17.20.30.55/32", the route is "17.20.30.55" and the prefix is 32. In some implementations, the VRF-ID, route and the prefix may be provided by the packet processing logic 106 after parsing the packet header. The VRF-ID may indicate an identifier for a route in a virtual routing and forwarding domain. The prefix may indicate a number of bits that may be used to segment the route. For example, a route may include a destination address including any number of bits from 1 to 32. In some implementations, the prefix may include a closest desired length prefix (DLP), which can be a multiple of 4, e.g., 4, 8, 12, 16, . . . , 32. The route can be rounded off based on the DLP and the segmented value may be used by the hash function 302a to generate a key and an index. For example, the hash function 302a may provide a hash table identifier (ID) and a bucket index. The key and some other relevant information related to the route can be inserted at the bucket index for the given hash table ID.

Every route can be inserted at many possible alternate locations given by different hash functions. For example, for a given route, a hash function 302a, a hash function 302b, a hash function 302c, a hash function 302y-1 and a hash function 302y may be computed. The same hash functions can be used when performing a search for a route to compute a match, e.g., longest prefix match (LPM). Hence, the route insertion method can allow multiple alternative locations for a route to be stored or to be migrated if need arises. Computation of the bucket index inside each of the routing tables 112 can be done using a maximum possible number for the bucket capacity based on a maximum physical bucket count possible. If the bucket count per hash table (based on the current power domain configuration) is lower than the maximum capacity (always by an integer factor) then a new bucket index can be determined by rounding the bucket index value by the factor equal to current hash table bucket capacity compared to maximum possible bucket capacity. This factor can be stored in each entry. For example, the maximum bucket capacity for each hash table can be 1K (1024), but the current power-domain configuration can only enable 128 entries per hash table; then the hash table bucket index can be calculated using 1024 as the total capacity, but the value can be rounded down using (modulo 128) operation and the rounding down factor can be stored in the entry. For example, if the bucket index was 500, then index= (500% 128)=116, rounding factor=500/128=3.

In one embodiment, if the bucket at an index given by a first hash function is full, route migration can be performed. For example, the route migration may be implemented by computing another hash table ID and the bucket index to insert the route with enough information to determine a match at this alternate location. As illustrated in the figure, if the bucket from the first routing table 200a at an index computed by the hash function 302a is full, another index for a bucket from the second routing table 200b can be computed using the hash function 302b. Similarly, if the bucket from the second routing table 200b at an index computed by the hash function 302b is full, another index for a bucket from the third routing table 200c can be computed using the hash function 302c. If the bucket from the third routing table 200c at an index computed by the hash function 302c is full, another index for a bucket from the (Y-1)th routing table 200y-1 can be computed using the hash function 302y-1. If the bucket from the (Y-1)th routing table 200y-1 at an index computed by the hash function 302y-1 is full, another index for a bucket from the Yth routing table 200y can be computed using the hash function 302y. If the bucket at an index given by the hash function 302y is full, the route cannot be inserted and an error may be returned.

Figure 4:
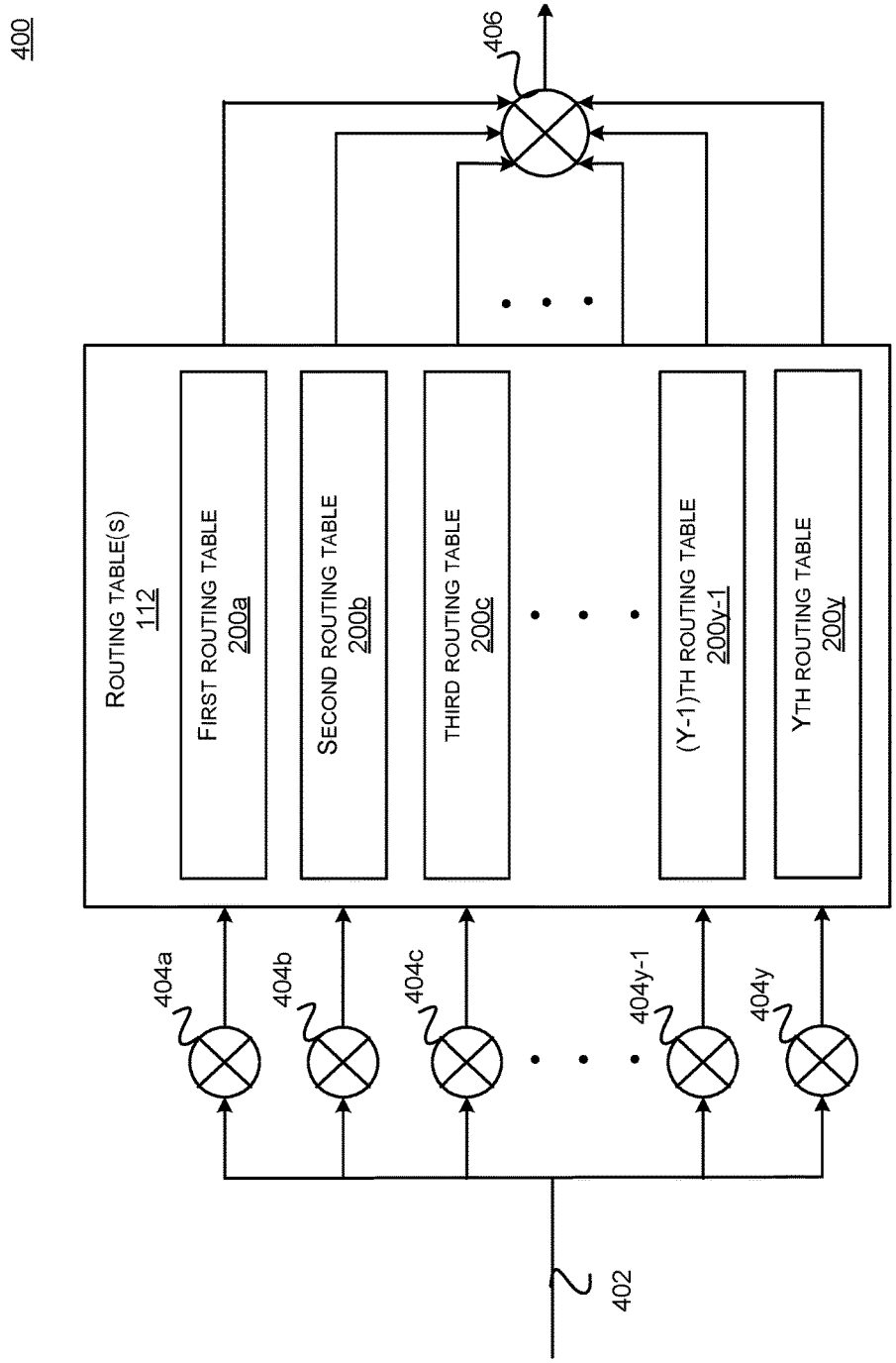
FIG. 4 illustrates a method for a route search process using a longest prefix match.

FIG. 4 illustrates a method 400 for a route search process using a longest prefix match.

When a packet is received, a hash can be computed using a hash function to identify all the potential buckets that route might be in. The key can be used to match against all the potential buckets to find the right route. For example, a hash function 404a can provide an index for the first routing table 200a, a hash function 404b can provide an index for the second routing table 200b, a hash function 404c can provide an index for the third routing table 200c, a hash function 404y-1 can provide an index for the (Y-1)th routing table 200y-1, and a hash function 404y can provide an index for the Yth routing table 200y. When searching for an LPM match for an ingress packet 402 using its {destination IP address, VRF-ID}, all hash functions can be used to compute hash-table indexes using prefix lengths of {4, 8, 12, . . . , 32} and all the routing tables 200a-200y can be searched in parallel. The route search algorithm can include logic to find a route stored at any of the possible alternate locations, using the additional information stored with each route as described earlier. An aggregator 406 can aggregate the match results from all the routing tables 200a-200y and can provide the longest prefix match from all the results. It is important to note that the longest-prefix match may be in any of the eight possible buckets. This can provide the LPM match for any given input packet.

Figure 5:
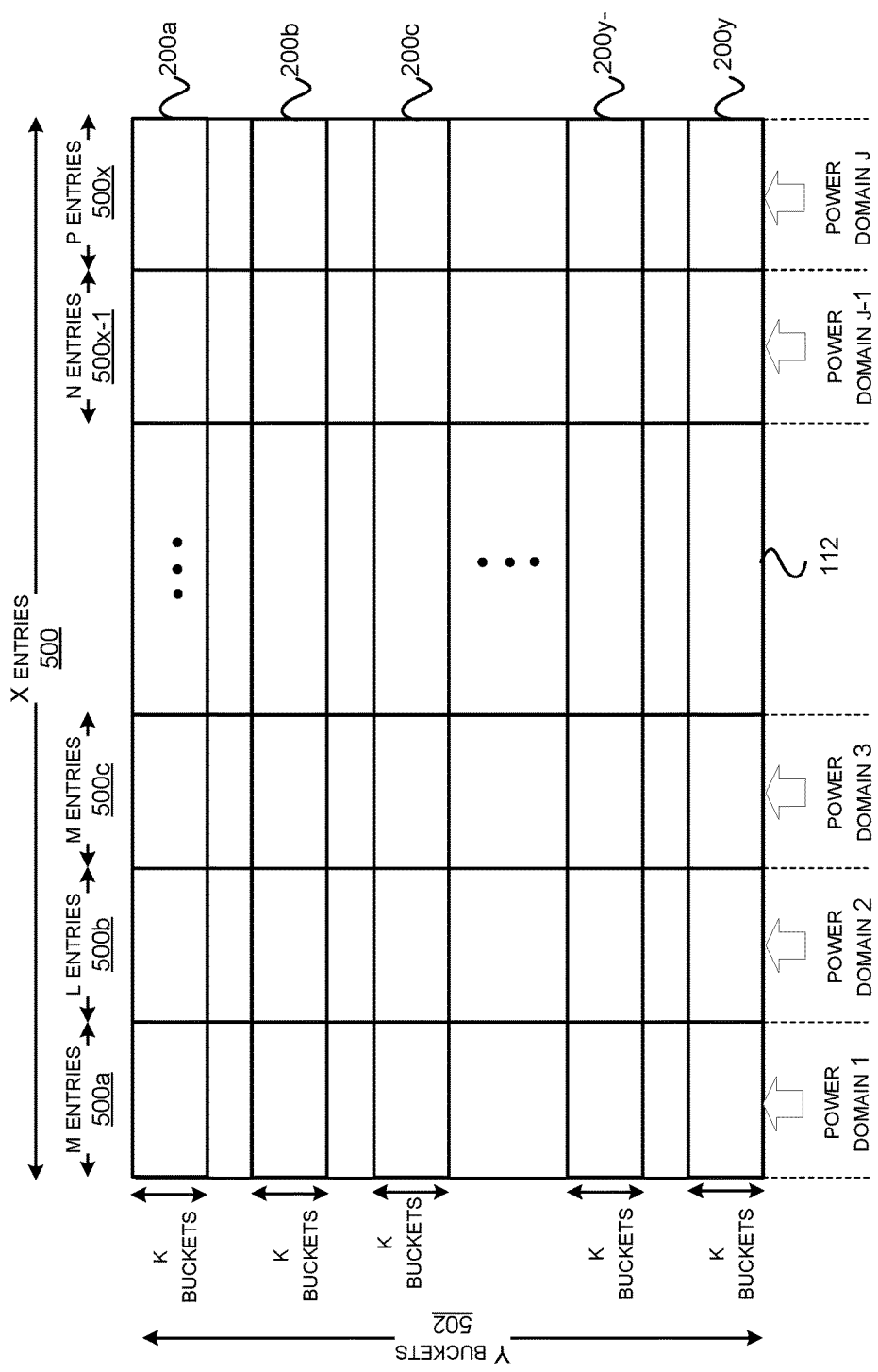
FIG. 5 illustrates various power domain configurations of the routing table, in accordance with one embodiment of the disclosed technologies.

FIG. 5 illustrates various power domain configurations of the routing table 112, in accordance with one embodiment of the disclosed technologies.

As illustrated in the figure, the routing table 112 may include a plurality of buckets and each bucket may include a plurality of entries. Each entry from the plurality of entries may be associated with a power domain from a plurality of power domains. For example, the routing table may include Y buckets 502 comprising a plurality of K buckets. Each of the K buckets may include X entries 500 comprising M entries 500a, L entries 500b, M entries 500c, N entries 500x-1, and P entries 500x. In one embodiment, each entry from the X entries 500 may be associated with a power domain from the power domains 1-J. For example, the M entries 500a may be associated with the power domain 1, L entries 500b may be associated with the power domain 2, M entries 500c may be associated with the power domain 3, N entries 500x-1 may be associated with the power domain J-1, and P entries 500x may be associated with the power domain J. Each of the X, Y, K, J, L, M, N and P can be positive integers. In one implementation, X can be 14, Y can be 8, K can be 1024, J can be 6, M can be 2, L can be 3, N can be 4, and P can be 1, e.g., the routing table 112 can include 8 routing tables, each routing table can have 1024 buckets, and each bucket can have 14 entries.

In some embodiments, each of the routing tables 200a-200y may be implemented using a hash table. Hash tables, by their very definition, can have probabilistic route distribution, in the sense that the hash tables may not be filled to full capacity in most instances. Hence, it is a common practice to build a hash table with over-capacity to compensate for unfilled entries. In some implementations, an occupancy constant (Ko) can be determined based on simulations by inserting various route samples in the routing table. As an example, the occupancy constant can be "0.68" for the insertion algorithm for a specific network device, as discussed with reference to FIGS. 3 and 4. The occupancy constant can be used to calculate over-capacity. For example, an estimation of the number of entries required to accommodate 100 routes can be calculated as (100/0.68=146). A lower value of the occupancy constant can be used for a further defensive estimation of the over-capacity calculation.

According to the embodiments, a power domain configuration from a plurality of power domain configurations may be associated with a number of power domains from the power domains 1-J. The number of power domains for each power domain configuration may be different from other power domain configurations. In some embodiments, each successive power domain configuration from the plurality of successive power domain configurations may include an additional power domain than a prior power domain configuration. For example, a first power domain configuration may be associated with one power domain (e.g., power domain 1), a second power domain configuration may be associated with two power domains (e.g., the power domain 1 and the power domain 2), and a third power domain configuration may be associated with three power domains (e.g., the power domain 1, power domain 2 and the power domain 3), and so on. According to some embodiments, each successive power domain configuration can support a higher number of network routes than the prior power domain configuration. For example, the second power domain configuration may support a higher number of network routes than the first power domain configuration, and the third power domain configuration may support even a higher number of network routes than the second power domain configuration. The number of network routes supported by each power domain configuration can be predetermined or can be computed dynamically.

In accordance with some embodiments, each power domain from the power domains 1-J can be turned on or turned off independently from one other. Enabling a power domain can indicate that the capacity of the routing table 112 has increased by the number of entries associated with that power domain. Similarly, disabling a power domain can indicate that the capacity of the routing table 112 has decreased by the number of entries associated with that power domain. For example, enabling of the power domain 2 may indicate that the capacity of the routing tables 112 has increased by the L entries 500*b* for each bucket from the Y buckets 502. Similarly, disabling the power domain 3 may indicate that the capacity of the routing tables 112 has decreased by the M entries 500*c* for each bucket from the Y buckets 502. In accordance with the embodiments, a power domain configuration can be switched to another power domain configuration dynamically to perform power scaling based on the varying load conditions. Further, SRAM implementation of the hash tables can allow independent power-on and power-off capability for different power domains. For example, in some implementations, each power domain can be implemented using a separate SRAM module and can be controlled independently.

Generally, a total number of routes "T" that can be supported by a network device at the deployment is known. In some implementations, a total number of entries "E" required to meet a specific route capacity for the given total number of routes "T" can be calculated using an equation 1, and entries per bucket "Eb" for a total number of buckets "B" can be calculated using an equation 2:

$$E=(T\times(1/Ko)), \quad \text{Equation 1}$$

$$Eb=(E/B). \quad \text{Equation 2}$$

As an example, for a first network device, with T=64K, B=8K, Ko=0.68, $$E=(64\times1024)\times(1/0.68)=96376.$$

If the total number of buckets B=8K, $$Eb=(96376/8192)=11.$$

As another example, for a second network device, with T=32K, B=8K, Ko=0.68, $$E=(32\times1024)\times(1/0.68)=48188.$$

If the total number of buckets B=8K, $$Eb=(48188/8192)=5.$$

According to some embodiments, the number of power domains that can be enabled or disabled to maintain the configuration that can support the total number of entries per bucket, as calculated above using the examples, can be determined. Thus, various power domain configurations associated with a different number of power domains can be determined. The number of power domains for each power domain configuration may be different from other power domain configurations to allow horizontal scaling of the power domains.

In some embodiments, each power domain configuration can be represented by a corresponding configuration identifier (Cf) and a route capacity (Rc). For example, the configuration identifier may be used to identify a power domain configuration from the plurality of power domain configurations, e.g., a first power domain configuration, a second power domain configuration, etc. The route capacity may be determined based on the number of entries per bucket "Eb" as calculated above using equation 2. In some implementations, the plurality of power domain configurations can be represented as {Cf1, Rc1}, {Cf2, Rc2}, ..., and {Cfn, Rcn}. For example, the first power domain configuration identified by Cf1 can support route capacity from 0 to Rc1, the second power domain configuration identified by Cf2 can support route capacity from Rc1 to (Rc2−1), and an nth power domain configuration identified by Cfn can support route capacity from ((Rcn−1)+1) to Rcn. Hence, each successive power domain configuration can support a higher number of network routes than the prior power domain configuration. In one embodiment, the route capacity for a power domain configuration can be predetermined by populating the routing tables using field data (e.g., route samples from field deployments) and by running simulation models. In another embodiment, the route capacity for a power domain configuration can be dynamically computed, e.g., based on types of network routes at a certain point in time, types of prefixes, number of VRF-IDs, number of requests for insertion of new network routes in the routing tables, migration algorithms, etc. Referring back to FIG. 1, various configuration identifiers {Cf1, Cf2, ..., Cfn} and the route capacity "E" for various power domain configurations can be stored in the memory 108, e.g., in the configuration registers 110 or using a suitable data structure. Referring back to the previous examples, if a current power domain configuration has five entries per bucket (e.g., Eb=5), and if there are total 8K buckets (e.g., B=8K), the route capacity supported by the current power domain configuration can be 32 K (4×8×1024). If the current power domain configuration is the second power domain configuration, the current power domain configuration can be represented as {Cf2, 32×1024}. In another example, if the current power domain configuration has eleven entries per bucket (e.g., Eb=11), and if there are total 8K buckets (e.g., B=8K), the route capacity supported by the current power domain configuration can be 64 K (8×8×1024). If the current power domain configuration is the nth power domain configuration, the current power domain configuration can be represented as {Cfn, 64×1024}.

Figure 6:
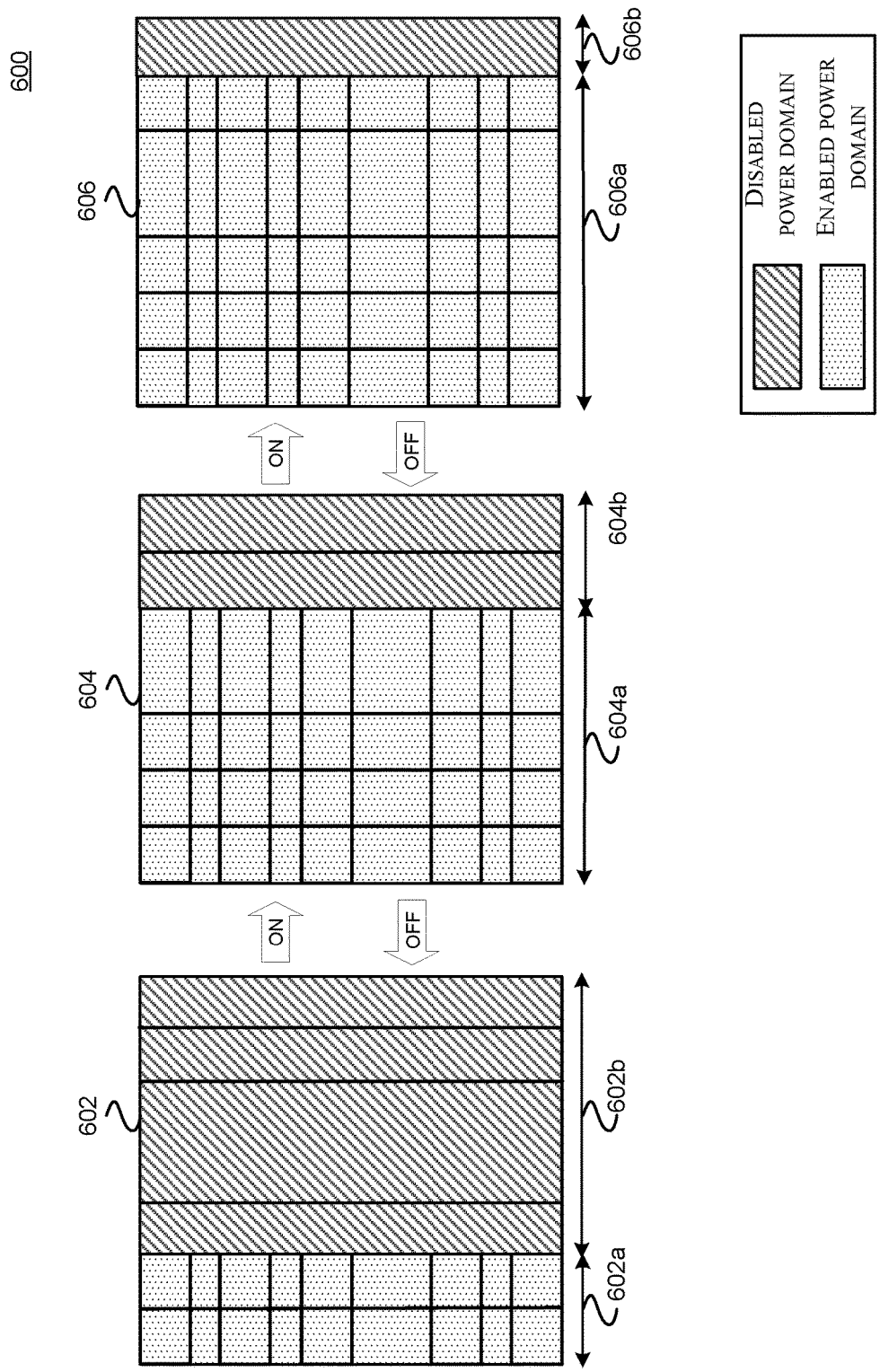
FIG. 6 illustrates horizontal scaling of the routing table for power management, in accordance with one embodiment of the disclosed technologies.

FIG. 6 illustrates a horizontal scaling 600 of the routing table 112 for power management, in accordance with one embodiment of the disclosed technologies.

FIG. 6 illustrates successive power domain configurations 602, 604 and 606. The number of power domains for each of the power domain configurations 602, 604, 606 is different from other power domain configurations. The power domain configuration 602 can include 602a enabled power domains and 602b disabled power domains. The power domain configuration 604 can include 604a enabled power domains and 604b disabled power domains. The power domain configuration 606 can include 606a enabled power domains and 606b disabled power domains. In accordance with the embodiments, a power domain configuration can be switched to another power domain configuration by enabling or disabling a power domain. For example, the power domain configuration 602 can be switched to the power domain configuration 604 and the power domain configuration 604 can be further switched to the power domain configuration 606 for increasing load requirement (e.g., higher number of routes). Similarly, the power domain configuration 606 can be switched to the power domain configuration 604 and the power domain configuration 604 can be further switched to the power domain configuration 602 for decreasing load requirement (e.g., lower number of routes).

Figure 7:
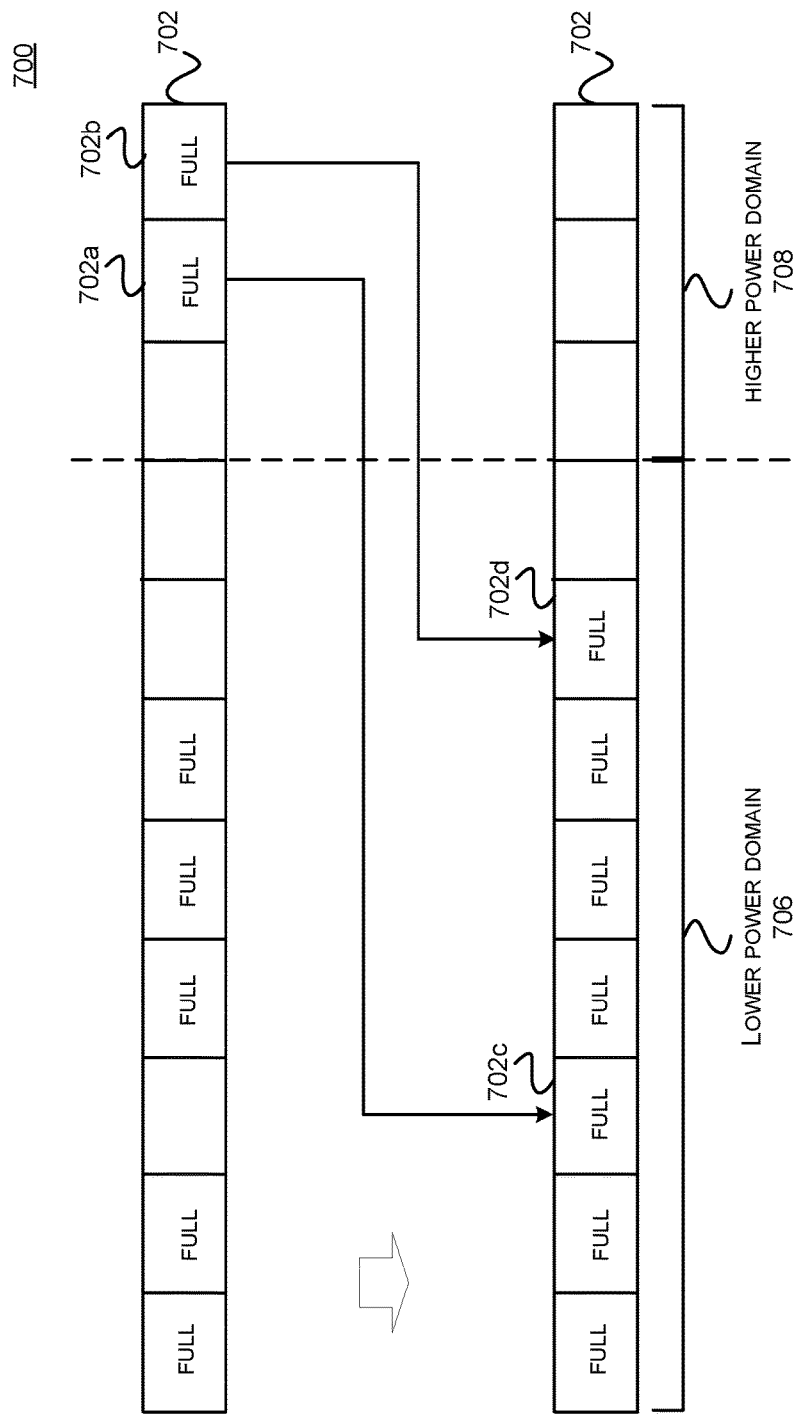
FIG. 7 illustrates a method for migration of entries to compact a bucket, in accordance with one embodiment of the disclosed technologies.

FIG. 7 illustrates a method 700 for migration of entries to compact a bucket, in accordance with one embodiment of the disclosed technologies.

As illustrated in the figure, a bucket 702 may include a plurality of entries in a lower power domain 706 and a plurality of entries in a next higher power domain 708. Referring back to FIG. 5, the bucket 702 may be part of the Y buckets 502, the lower power domain 706 may be the power domain 1, and the next higher power domain 708 may be the power domain 2. For example, the lower power domain 706 may be enabled in the first power domain configuration and both lower power domain 706 and the next higher power domain 708 may be enabled in the second power domain configuration. According to an embodiment, in order to perform horizontal scaling, entries 702a and 702b can be migrated from the next higher power domain 708 to the lower power domain 706 within the same bucket 702. For example, migration of an entry can imply moving the data stored in the entry from a first location to a second location. As illustrated, the data stored in the entry 702a can be moved to an unoccupied entry 702c and the data stored in the entry 702b can be moved to an unoccupied entry 702d to compact the bucket 702. Once the data stored in the entries 702a and 702b is moved, the next higher power domain 708 can be disabled to save power. According to the embodiments, the entry 702a or the 702b can be migrated to any of the lower power domains that may or may not be adjacent to the higher power domain 708. For example, referring back to FIG. 5, if the higher power domain 708 is the power domain J, the entry 702a or the 702b can be migrated to any of the lower power domains, e.g., the power domain 1, power domain 2, power domain 3, . . . , power domain J-1. In one instance, the entry 702a may be migrated to the power domain 1 and the entry 702b may be migrated to the power domain 3.

Figure 8:
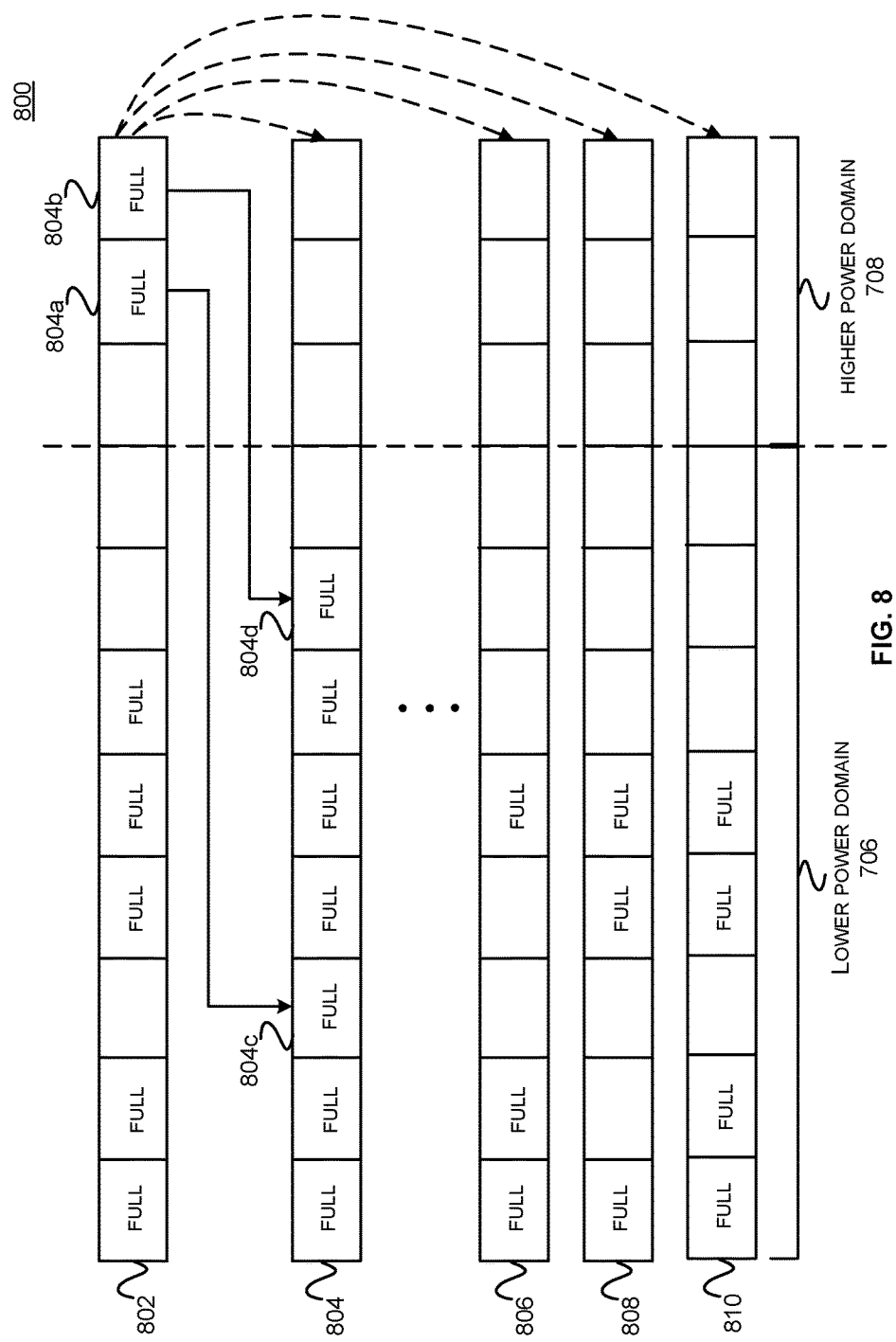
FIG. 8 illustrates a method for migration of entries to different buckets, in accordance with one embodiment of the disclosed technologies.

FIG. 8 illustrates a method 800 for migration of entries to different buckets, in accordance with one embodiment of the disclosed technologies.

As illustrated in the figure, buckets 802, 804, 806, 808 and 810 may be part of the Y buckets 502. Each of the buckets 802, 804, 806, 808 and 810 may be eligible to be migration candidates. In some implementations, buckets indexed with other DLP prefix hash values can be eligible to be migration candidates, as discussed with reference to FIG. 3. For example, each of the buckets 802, 804, 806, 808 and 810 may include empty entries located in the lower power domain 706 that can be used for migration of entries 804a and 804b from the higher power domain 708. As shown in the figure, the entries 804a and 804b can be moved to the bucket 804 at locations 804c and 804d respectively. The lower power domain 706 may or may not be adjacent to the higher power domain 708 as discussed with reference to FIG. 7. Once the entries are migrated to the lower power domain 706, the higher power domain 708 can be disabled to save power.

In one embodiment, migration of the entries may include copying the entries to the new location. For example, the data stored in the entries 804a and 804b can be copied to the new locations 804c and 804d. In some instances, the same data may be available in both the locations for a period of time until the power domain associated with the old location is disabled or the entries are removed.

In one embodiment, a computer implemented method may comprise determining, by a network device, that, for a current power domain configuration from a plurality of power domain configurations, a total number of network routes is less than a threshold for a lower power domain configuration from the plurality of power domain configurations. The plurality of power domain configurations may be stored in a memory. Each power domain configuration may be associated with a respective number of power domains from a plurality of power domains, and a respective number of network routes supported by the power domain configuration. The respective number of power domains for each power domain configuration may be different from other power domain configurations. The memory may also be configured to store a routing table. The routing table may comprise buckets and each bucket may comprise entries to store data associated with network routes. Each entry may be associated with a power domain from the plurality of power domains. The network device may be configured to identify entries from the routing table that correspond to a power domain from the current power domain configuration, which is not part of the lower power domain configuration. The network device may further be configured to migrate the identified entries to a power domain associated with the lower power domain configuration and switch to the lower power domain configuration by transitioning the power domain from the current power domain configuration to a lower power state. A method to disable a power domain is further explained with the help of FIG. 9.

Figure 9:
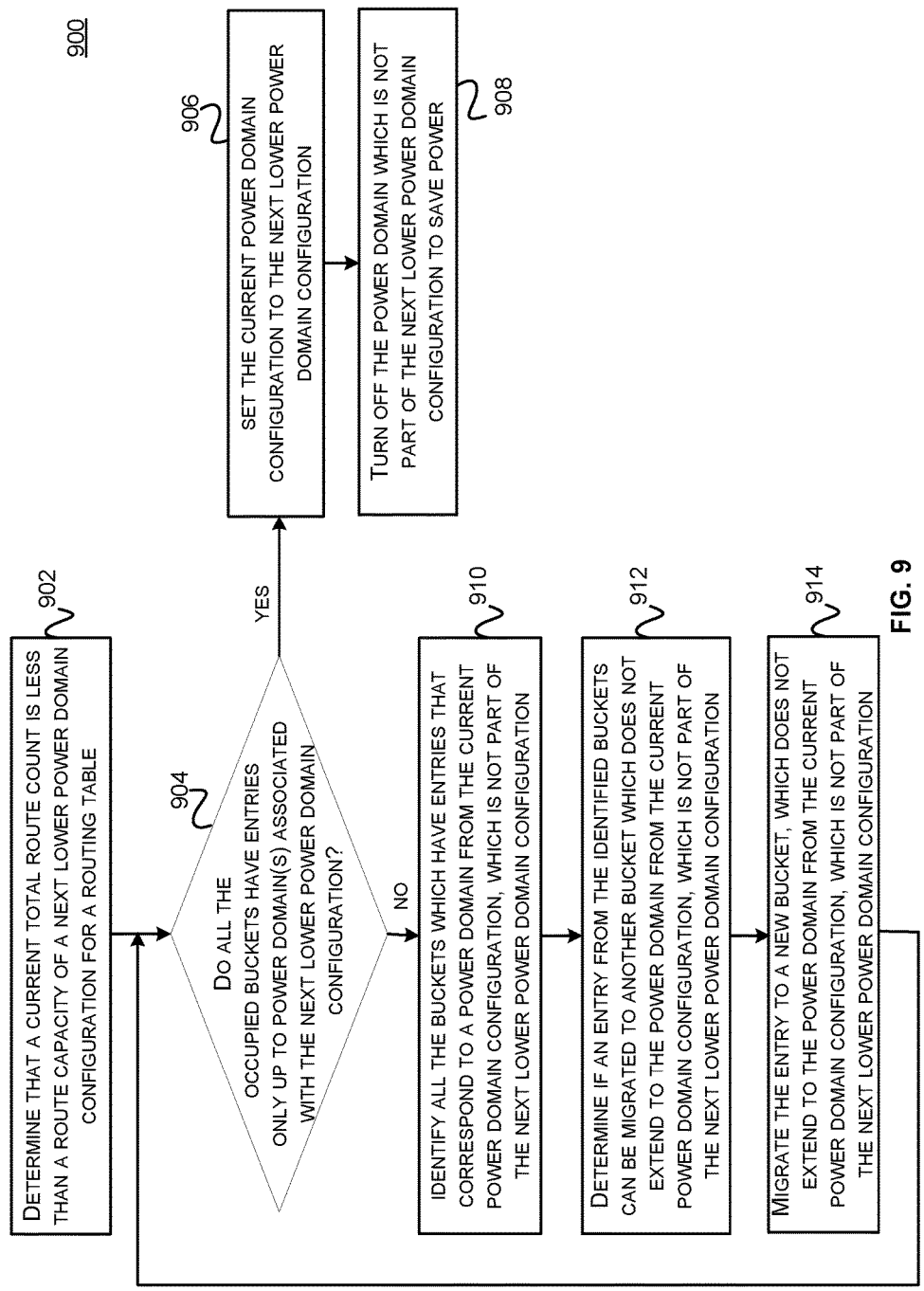
FIG. 9 illustrates a method for disabling a power domain, in accordance with one embodiment of the disclosed technologies.

FIG. 9 illustrates a method 900 for disabling a power domain, in accordance with one embodiment of the disclosed technologies.

In step 902, it can be determined if a current total route count is less than a route capacity of a next lower power domain configuration. For example, in some implementations, the power domain controller 114 can determine if a total number of routes in the current power domain configuration is less than the route capacity of a next lower power domain configuration.

Referring back to FIG. 5, as an example, the current power domain configuration can be the second power domain configuration. For example, the power domain 1 and the power domain 2 may be enabled in the second power domain configuration. The next lower power domain configuration may be the first power domain configuration, which may only have the power domain 1 enabled. As discussed earlier, the route capacity of the first power domain configuration may be less than the route capacity of the second power domain configuration. If the current total route count is less than the route capacity of the first power domain configuration, it may be possible for the first power domain configuration to accommodate the current number of routes, which can be determined by reviewing the routing tables 112.

In step 904, it can be determined if all the occupied buckets have entries only up to power domain(s) associated with the next lower power domain configuration. For example, in some implementations, the power domain controller 114 can determine if all the occupied buckets in the routing table 112 only have entries in the power domain 1 associated with the first power domain configuration. Referring back to FIG. 5, the Y buckets 502 may only occupy the M entries 500a, which are associated with the power domain 1. It will be understood that not all the entries of the M entries 500a may be occupied.

In step 906, if the occupied buckets have entries only up to power domain(s) associated with the next lower power domain configuration, the current power domain configuration may be set to a next lower power domain configuration. For example, the power domain controller 114 may switch the current power domain configuration to the first power domain configuration from the second power domain configuration.

In step 908, the power domain which is not part of the next lower power domain configuration can be turned off to save power. Referring back to FIG. 5, the power domain 2, which is not part of the power domain configuration 1, can be disabled to save power.

In step 910, if all the occupied buckets have entries in the power domains(s) associated with the current power domain configuration, which is not part of the next lower power domain configuration, all the buckets can be identified which have entries that correspond to a power domain from the current power domain configuration, which is not part of the next lower power domain configuration. Referring back to FIG. 5, the buckets which have entries in the L entries 500b associated with the power domain 2 can be identified.

In step 912, determine if an entry from the identified buckets can be migrated to another bucket which does not extend to the power domain from the current power domain configuration, which is not part of the next lower power domain configuration. Referring back to FIG. 5, the power domain controller can determine if an entry from an identified bucket which has entries from the L entries 500b associated with the power domain 2 can be migrated to another bucket which only has entries in the M entries 500a associated with the power domain 1.

In step 914, the entry from the identified bucket can be migrated to another bucket which does not extend to the power domain from the current power domain configuration, which is not part of the next lower power domain configuration. Referring back to FIG. 5, an entry from an identified bucket which has entries from the L entries 500b associated with the power domain 2 can be migrated to another bucket which only has entries in the M entries 500a associated with the power domain 1. An entry can be migrated from one bucket to another bucket as discussed with reference to FIGS. 8 and 9.

The steps 904, 910, 912 and 914 can be repeated for all the entries for each identified bucket, which has entries associated with the power domain from the current power domain configuration, which is not part of the next lower power domain configuration. Note that each identified bucket can support a number of entries equal to or less than the entries associated with the power domain 1.

In one embodiment, a method for enabling a power domain can be executed when a request to insert a new route is received. For example, a computer implemented method may comprise receiving, by a network device, a request to store data associated with a new network route in a routing table, wherein the routing table is stored in a memory. The routing table may comprise buckets and each bucket may comprise entries to store data associated with network routes. Each entry may be associated with a power domain from a plurality of power domains. The memory may also be configured to store a plurality of power domain configurations, wherein each power domain configuration may be associated with a respective number of power domains from the plurality of power domains, and a respective number of network routes supported by the power domain configuration. The respective number of power domains for each power domain configuration may be different from other power domain configurations. The network device may be configured to determine that, for a current power domain configuration, a total number of network routes including the new network route is more than a number of network routes supported by the current power domain configuration. The network device may further be configured to switch to a higher power domain configuration that supports a higher number of network routes than the current power domain configuration by enabling an additional power domain associated with the higher power domain configuration. A method to enable a power domain is further explained with the help of FIG. 10.

Figure 10:
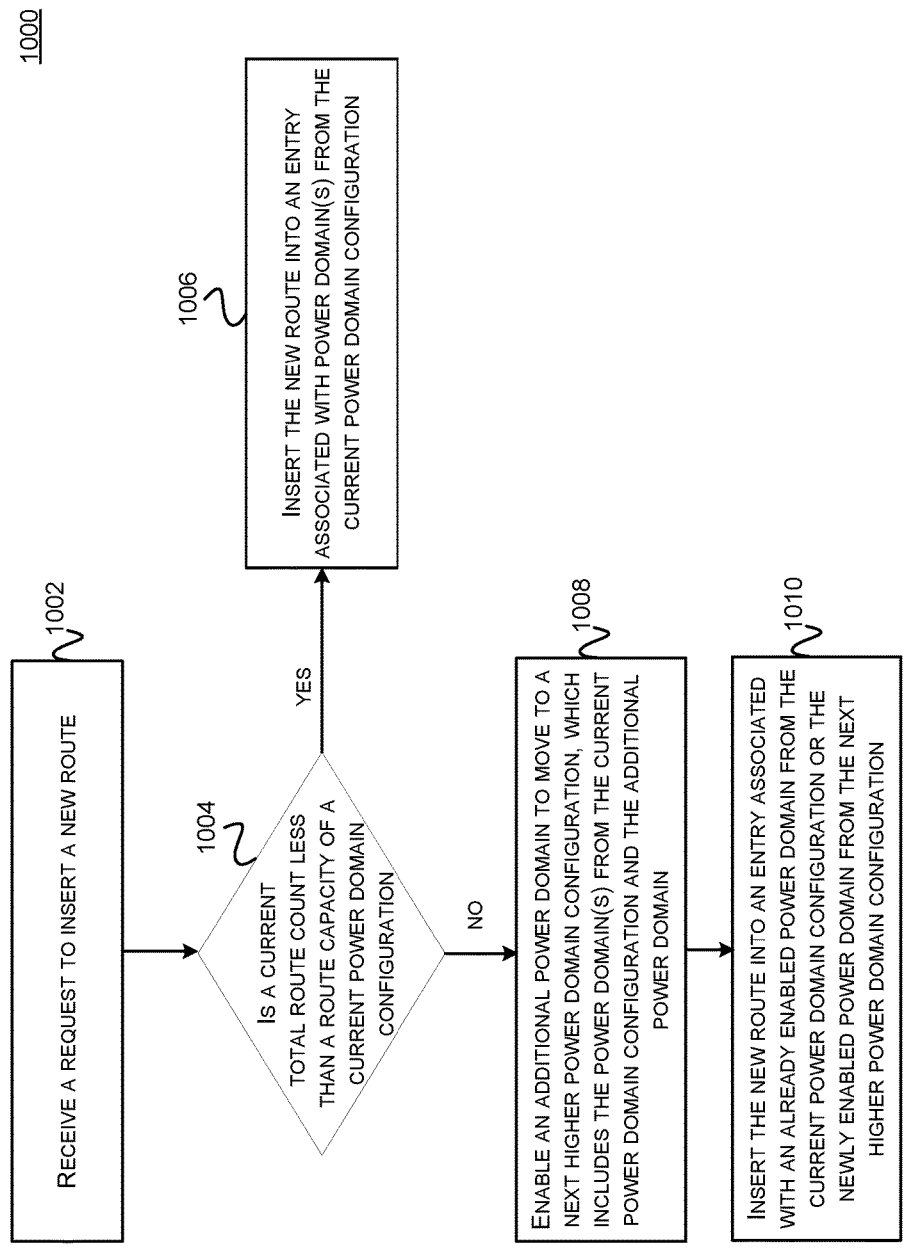
FIG. 10 illustrates a method for enabling a power domain, in accordance with one embodiment of the disclosed technologies.

FIG. 10 illustrates a method 1000 for enabling a power domain, in accordance with one embodiment of the disclosed technologies.

In step 1002, a request to insert a new route may be received. Referring back to FIG. 1, the request may be received by the power domain controller 114 to store data for the new route in the routing table 112. In some embodiments, receiving a request to insert a new route can trigger a new domain power on algorithm as described using the method 1000. As an example, the current power domain configuration may be a first power domain configuration, identified by Cf1, which may be associated with the power domain 1, as discussed with reference to FIG. 5. The current power domain configuration may be determined at a power-up of the network device 100.

In step 1004, it is determined if a current total route count is less than a route capacity of a current power domain configuration. The power domain controller 114 may determine if the total number of routes currently programmed in the routing table 112 is less than the route capacity of the first power domain configuration. As discussed with reference to FIG. 5, the route capacity of the first power domain configuration Cf1 may be determined using the equation 1 in terms of the total number of entries "E" calculated based on the given number of routes "T" including the new route, and the occupancy constant Ko.

In step 1006, if the total number of routes currently programmed in the routing table 112 is less than the route capacity of the current power domain configuration, the new route can be inserted into an entry associated with the power domain(s) from the current power domain configuration. For example, the data for the new route can be inserted into one of the unoccupied entries from the M entries 500a associated with the first power domain. The new route can be inserted using the route insertion method as discussed with reference to FIG. 3 or any other suitable method.

In step 1008, if the total number of routes currently programmed in the routing table 112 is more than the route capacity of the current power domain configuration, an additional power domain may be enabled to switch to a next higher power domain configuration. For example, when a new network route is received, a total number of network routes including the new network route can be more than a number of network routes supported by the current power domain configuration. Thus, according to the embodiments, the network device 100 can switch to a next higher power domain configuration that can support a higher number of network routes than the current power domain configuration by enabling an additional power domain associated with the next higher power domain configuration. Thus the next higher power domain configuration may include the power domain(s) associated with the current power domain configuration, and the newly enabled power domain. Referring back to FIG. 5, if the total number of routes currently programmed in the routing table 112 is more than the route capacity of the first power domain configuration, the power domain 2 may be enabled to switch to the second power domain configuration. Enabling the power domain 2 may increase the capacity of each of the Y buckets 502 by the number of entries corresponding to the L entries 500b associated with the power domain 2. All the hash functions and the LPM search functions, as discussed with reference to FIG. 3 and FIG. 4, may be automatically updated to take into account the higher number of entries in each of the Y buckets 502.

In step 1010, the new route can be inserted into an entry associated with an already enabled power domain from the current power domain configuration or the newly enabled power domain(s) from the next higher power domain configuration. For example, as discussed with reference to FIG. 5, there may be empty entries associated with the already enabled power domains since the routing tables were designed using the over capacity factor Ko. Referring back to FIG. 5, the new route can be inserted in an entry from the M entries 500a associated with the already enabled power domain 1 or from the L entries 500b associated with the newly enabled power domain 2. The new route can be inserted using the route insertion method as discussed with reference to FIG. 3 or any other suitable method.

Various embodiments of the disclosed technologies can allow dynamic power scaling of the power domains based on real-time load conditions in a network device. Hash table implementation of the routing table can allow random insertion of a route entry in contrast to TCAMs which can be restricted to ordering dependency. The SRAMs used for implementing the routing table can be turned-on or turned off independently for different power domains. Horizontal scaling can allow addition or removal of a fixed number of entries across the routing table. The flexibility to enable or disable a power domain during run time can provide an efficient method of power reduction as compared to traditional devices which may require rebooting of the device for different power configurations and load requirements. Thus, embodiments can provide power reduction with minimum system overhead.

Figure 11:
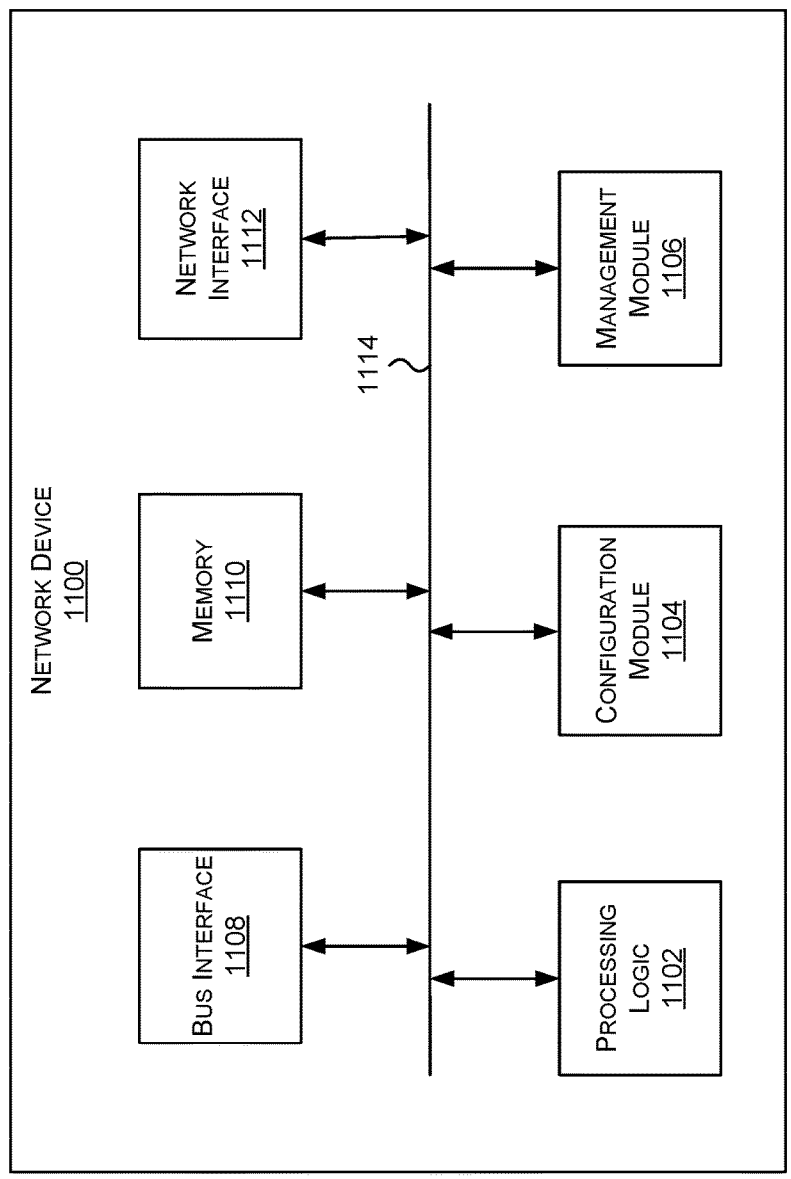
FIG. 11 illustrates an example architecture for features and systems described herein that includes one or more service provider computers and/or a user device connected via one or more networks, according to some embodiments.

FIG. 11 illustrates an example of a network device 1100. Functionality and/or several components of the network device 1100 may be used without limitation with other embodiments disclosed elsewhere in this disclosure, without limitations. For example, in some implementations, the network device 1100 may implement functionality of the network device 100, as discussed with reference to FIG. 1. The network device 1100 may facilitate processing of packets and/or forwarding of packets from the network device 1100 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1100 may be the recipient and/or generator of packets. In some implementations, the network device 1100 may modify the contents of the packet before forwarding the packet to another device. The network device 1100 may be a peripheral device coupled to another computer device, a switch, a router or any other suitable device enabled for receiving and forwarding packets.

In one example, the network device 1100 may include processing logic 1102, a configuration module 1104, a management module 1106, a bus interface module 1108, memory 1110, and a network interface module 1112. These modules may be hardware modules, software modules, or a combination of hardware and software. In certain instances, modules may be interchangeably used with components or engines, without deviating from the scope of the disclosure. The network device 1100 may include additional modules, not illustrated here, such as components discussed with respect to the nodes disclosed in FIG. 12. In some implementations, the network device 1100 may include fewer modules. In some implementations, one or more of the modules may be combined into one module. One or more of the modules may be in communication with each other over a communication channel 1114. The communication channel 1114 may include one or more busses, meshes, matrices, fabrics, a combination of these communication channels, or some other suitable communication channel.

The processing logic 1102 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1102 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as, for example, busses, level 1 (L1) caches, and/or level 2 (L2) caches. The instructions executed by the processing logic 1102 may be stored on a computer-readable storage medium, for example, in the form of a computer program. The computer-readable storage medium may be non-transitory. In some cases, the computer-readable medium may be part of the memory 1110.

The memory 1110 may include either volatile or non-volatile, or both volatile and non-volatile types of memory. The memory 1110 may, for example, include random access memory (RAM), read only memory (ROM), Electrically Erasable Programmable Read-Only Memory (EEPROM), flash memory, and/or some other suitable storage media. In some cases, some or all of the memory 1110 may be internal to the network device 1100, while in other cases some or all of the memory may be external to the network device 1100. The memory 1110 may store an operating system comprising executable instructions that, when executed by the processing logic 1102, provides the execution environment for executing instructions providing networking functionality for the network device 1100. In some embodiments, the memory 1110 may include instructions for executing some or all of the functionality of the power domain controller 114. The memory may also store and maintain several data structures and routing tables for facilitating the functionality of the network device 1100. For example, the memory 1110 may store the routing tables 112, as discussed with reference to FIG. 5.

In some implementations, the configuration module 1104 may include one or more configuration registers. Configuration registers may control the operations of the network device 1100. In some implementations, one or more bits in the configuration register can represent certain capabilities of the network device 1100. Configuration registers may be programmed by instructions executing in the processing logic 1102, and/or by an external entity, such as a host device, an operating system executing on a host device, and/or a remote device. The configuration module 1104 may further include hardware and/or software that control the operations of the network device 1100.

In some implementations, the management module 1106 may be configured to manage different components of the network device 1100. In some cases, the management module 1106 may configure one or more bits in one or more configuration registers at power up, to enable or disable certain capabilities of the network device 1100. In certain implementations, the management module 1104 may use processing resources from the processing logic 1102. In other implementations, the management module 1106 may have processing logic similar to the processing logic 1102, but segmented away or implemented on a different power plane than the processing logic 1102.

The bus interface module 1108 may enable communication with external entities, such as a host device and/or other components in a computing system, over an external communication medium. The bus interface module 1108 may include a physical interface for connecting to a cable, socket, port, or other connection to the external communication medium. The bus interface module 1108 may further include hardware and/or software to manage incoming and outgoing transactions. The bus interface module 1108 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1108 may include the physical layer for any of these bus protocols, including a connector, power management, and error handling, among other things. In some implementations, the network device 1100 may include multiple bus interface modules for communicating with multiple external entities. These multiple bus interface modules may implement the same local bus protocol, different local bus protocols, or a combination of the same and different bus protocols.

The network interface module 1112 may include hardware and/or software for communicating with a network. This network interface module 1112 may, for example, include physical connectors or physical ports for wired connection to a network, and/or antennas for wireless communication to a network. The network interface module 1112 may further include hardware and/or software configured to implement a network protocol stack. The network interface module 1112 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1100 may include multiple network interface modules, each configured to communicate with a different network. For example, in these implementations, the network device 1100 may include a network interface module for communicating with a wired Ethernet network, a wireless 802.11 network, a cellular network, an Infiniband network, etc.

The various components and modules of the network device 1100, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 12.

Figure 12:
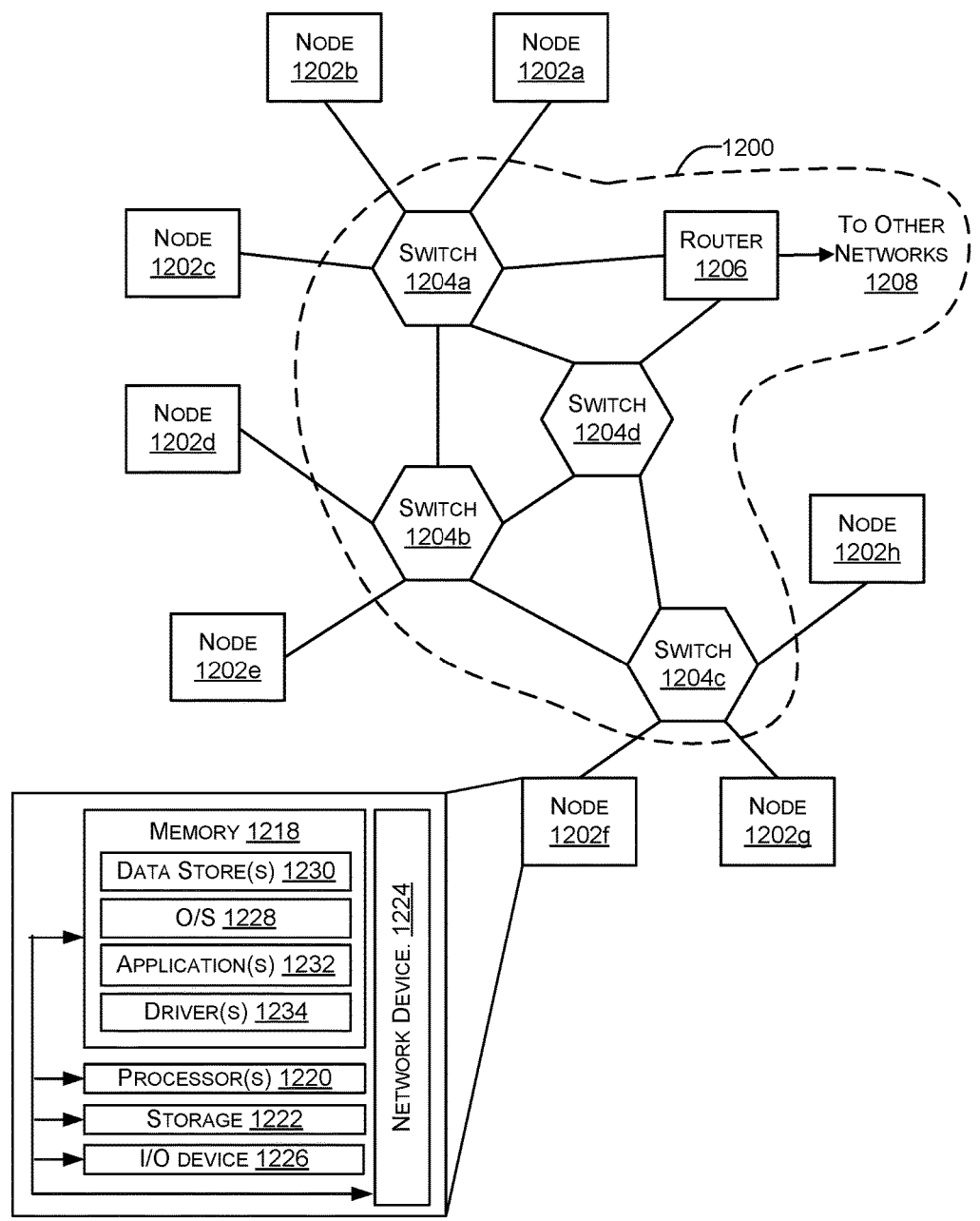
FIG. 12 illustrates aspects of an example environment of a computing system for implementing aspects in accordance with some embodiments.

FIG. 12 illustrates a network 1200, illustrating various different types of network devices 1100 of FIG. 11, such as nodes comprising the network device, switches and routers. In certain embodiments, the network 1200 may be based on a switched architecture with point-to-point links. As illustrated in FIG. 12, the network 1200 includes a plurality of switches 1204a-1204d, which may be arranged in a network. In some cases, the switches are arranged in a multi-layered network, such as a Clos network. A network device 1100 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1204a-1204d may be connected to a plurality of nodes 1202a-1202h and provide multiple paths between any two nodes.

The network 1200 may also include one or more network devices 1100 for connection with other networks 1208, such as other subnets, LANs, wide area networks (WANs), or the Internet, and may be referred to as routers 1206. Routers use headers and forwarding tables to determine the best path for forwarding the packets, and use protocols such as internet control message protocol (ICMP) to communicate with each other and configure the best route between any two devices.

In some examples, network(s) 1200 may include any one or a combination of many different types of networks, such as cable networks, the Internet, wireless networks, cellular networks and other private and/or public networks. Interconnected switches 1204a-1204d and router 1206, if present, may be referred to as a switch fabric, a fabric, a network fabric, or simply a network. In the context of a computer network, terms "fabric" and "network" may be used interchangeably herein.

Nodes 1202a-1202h may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202a-1202h may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1226 that allow the node(s) 1202a-1202h to communicate with a stored database, another computing device or server, user terminals and/or other devices on the network(s) 1200. The network device(s) 1224 of FIG. 12 may include similar components discussed with reference to the network device 1100 of FIG. 11.

In some implementations, the network device 1226 is a peripheral device, such as a PCI-based device. In these implementations, the network device 1226 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1108 may implement NVMe, and the network device 1226 may be connected to a computing system using a PCIe interface.

A PCI-based device may include one or more functions. A "function" describes operations that may be provided by the network device 1226. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1226 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as, for example, a virtual machine) running on a host device.

The modules described herein may be software modules, hardware modules or a suitable combination thereof. If the modules are software modules, the modules can be embodied on a non-transitory computer-readable medium and processed by a processor in any of the computer systems described herein. It should be noted that the described processes and architectures can be performed either in real-time or in an asynchronous mode prior to any user interaction. The modules may be configured in the manner suggested in FIG. 11, FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device comprising:
   a memory configured to store:
      a routing table comprising buckets, each bucket comprising entries to store data associated with network routes, wherein the entries of each bucket are associated with a plurality of power domains; and
      identifiers for a plurality of successive power domain configurations,
         wherein each successive power domain configuration from the plurality of successive power domain configurations comprises an additional power domain than a prior power domain configuration, and
         wherein each successive power domain configuration supports a higher number of network routes than the prior power domain configuration; and
   a power domain controller coupled to the memory, wherein the power domain controller is configured to switch between successive power domain configurations based on the number of network routes supported by the successive power domain configurations, and a total number of current network routes.

2. The network device of claim 1, wherein switching between the successive power domain configurations includes switching between a higher power domain configuration and a lower power domain configuration.

3. The network device of claim 1, wherein each successive power domain configuration supports a predefined number of network routes.

4. An apparatus comprising:
   a memory configured to store:
      a routing table comprising buckets, each bucket comprising entries to store data associated with network routes, wherein the entries of each bucket are associated with a plurality of power domains; and
      a plurality of power domain configurations, wherein each power domain configuration is associated with:
         a respective number of power domains from the plurality of power domains, wherein the respective number of power domains for each power domain configuration is different from other power domain configurations, and
         a respective number of network routes supported by the power domain configuration; and
   a power domain controller coupled to the memory, the power domain controller configured to:
      receive a request to store data associated with a new network route;
      determine that, for a current power domain configuration, a total number of network routes including the new network route is more than a number of network routes supported by the current power domain configuration; and
      switch to a first power domain configuration that supports a higher number of network routes than the current power domain configuration by enabling an additional power domain associated with the first power domain configuration.

5. The apparatus of claim 4, wherein after switching to the first power domain configuration, the power domain controller is further configured to:
   determine that, for the first power domain configuration, the total number of network routes is less than a threshold for a second power domain configuration;

identify entries that correspond to a power domain associated with the first power domain configuration, which is not part of the second power domain configuration;
migrate the identified entries to a power domain associated with the second power domain configuration; and
switch to the second power domain configuration by transitioning the power domain associated with the first power domain configuration to a lower power state.

6. The apparatus of claim 4, wherein after switching to the first power domain configuration, the power domain controller is further configured to store the data associated with the new network route in an entry associated with a power domain from the first power domain configuration.

7. The apparatus of claim 4, wherein enabling the additional power domain associated with the first power domain configuration includes adding a pre-defined number of entries associated with the additional power domain to each bucket in the routing table.

8. The apparatus of claim 4, wherein enabling the additional power domain associated with the first power domain configuration indicates turning on power to a pre-defined number of entries associated with the additional power domain.

9. The apparatus of claim 4, wherein the memory includes a static random access memory (SRAM).

10. The apparatus of claim 4, wherein the apparatus is part of a switch or a router.

11. The apparatus of claim 4, wherein the number of network routes supported by each power domain configuration is determined dynamically.

12. The apparatus of claim 4, wherein the routing table comprises hash tables, and the buckets are part of the hash tables.

13. The apparatus of claim 4, wherein after switching to the first power domain configuration, the power domain controller is further configured to:
determine a round down factor based on a maximum capacity of the routing table and a number of network routes supported by the first power domain configuration;
store the round down factor in each entry of the entries associated with a number of power domains of the first power domain configuration;
determine a first bucket index based on the data;
determine a second bucket index based on the first bucket index and the round down factor;
identify a bucket to store the data based on the second bucket index; and
store the data at the identified bucket.

14. The apparatus of claim 13, wherein the power domain controller is further configured to:
switch to a second power domain configuration;
determine a number of network routes supported by the second power domain configuration;
determine an updated round down factor based on the maximum capacity of the routing table and a number of network routes supported by the second power domain configuration; and
store the updated round down factor in each entry of the entries associated with a number of power domains of the second power domain configuration.

15. The apparatus of claim 4, wherein:
the routing table is a first routing table associated with a first hash function;
the plurality of power domains is a first plurality of power domains;

the memory is further configured to store a second routing table associated with a second hash function, the second routing table comprising buckets, each bucket comprising entries to store data associated with network routes, the entries of each bucket of the second routing table being associated with a second plurality of power domains;
the power domain controller is further configured to:
identify, based on applying the first hash function to the data, a first bucket in the first routing table to store the data;
responsive to determining that the first bucket is full:
identify, based on applying the second hash function to the data, a second bucket in the second routing table to store the data; and
store the data at an entry of the second bucket.

16. The apparatus of claim 15, wherein the first plurality of power domains is identical to the second plurality of power domains.

17. An apparatus comprising:
a memory configured to store:
a routing table comprising buckets, each bucket comprising entries to store data associated with network routes, wherein the entries of each bucket are associated with a plurality of power domains; and
a plurality of power domain configurations, wherein each power domain configuration is associated with:
a respective number of power domains from the plurality of power domains, wherein the respective number of power domains for each power domain configuration is different from other power domain configurations, and
a respective number of network routes supported by the power domain configuration; and
a power domain controller coupled to the memory, the power domain controller configured to:
determine that, for a current power domain configuration, a total number of network routes is less than a threshold for a first power domain configuration;
identify entries that correspond to a power domain from the current power domain configuration, which is not part of the first power domain configuration;
migrate the identified entries to second entries of a power domain associated with the first power domain configuration; and
switch to the first power domain configuration by transitioning the power domain from the current power domain configuration to a lower power state.

18. The apparatus of claim 17, wherein the transitioning the power domain from the current power domain configuration to the lower power state includes disabling the power domain.

19. The apparatus of claim 18, wherein the disabling the power domain indicates turning-off power to entries associated with the power domain.

20. The apparatus of claim 17, wherein the threshold includes a pre-defined number of routes supported by the first power domain configuration.

21. The apparatus of claim 17, wherein migrating the identified entries includes moving data stored in the identified entries of a bucket to second entries of the bucket, where the identified entries are associated with the power domain from the current power domain configuration, and the second entries are associated with the power domain from the first power domain configuration.

22. The apparatus of claim 17, wherein migrating the identified entries includes moving data stored in the identified entries of a first bucket to the second entries of a second bucket, where the identified entries of the first bucket are associated with the power domain from the current power domain configuration, and the second entries of the second bucket are associated with the power domain from the first power domain configuration.

23. The apparatus of claim 17, wherein the power domain controller is further configured to:
   determine that a total number of network routes is less than a threshold for a second power domain configuration;
   determine whether all the entries correspond to a power domain associated with the second power domain configuration; and
   upon determining that all the entries correspond to the power domain associated with the second power domain configuration, switch to the second power domain configuration by transitioning the power domain from the first power domain configuration to the lower power state.

24. The apparatus of claim 17, wherein the power domain controller is further configured to:
   receive a request to store data associated with a new network route;
   determine that, for the first power domain configuration, a total number of network routes including the new network route is more than a number of network routes supported by the first power domain configuration; and
   switch to a second power domain configuration that supports a higher number of network routes than the first power domain configuration by enabling an additional power domain associated with the second power domain configuration.

* * * * *